(12) United States Patent
Pham et al.

(10) Patent No.: US 12,523,801 B2
(45) Date of Patent: Jan. 13, 2026

(54) OPTICALLY DIFFUSIVE FILM WITH ELONGATED STRUCTURES

(71) Applicant: 3M INNOVATIVE PROPERTIES COMPANY, St. Paul, MN (US)

(72) Inventors: Tri D. Pham, Woodbury, MN (US); David A. Rosen, North Saint Paul, MN (US); Qunyi Chen, Woodbury, MN (US); Lisa A DeNicola, St. Paul, MN (US); Quinn D. Sanford, Mosinee, WI (US); Matthew S. Cole, Woodbury, MN (US); Bharat R. Acharya, Woodbury, MN (US); Matthew E. Sousa, Rosemount, MN (US); Robert D. Taylor, Stacy, MN (US); Benjamin J. Forsythe, Stillwater, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 560 days.

(21) Appl. No.: 17/923,269

(22) PCT Filed: Apr. 26, 2021

(86) PCT No.: PCT/IB2021/053423
§ 371 (c)(1),
(2) Date: Nov. 4, 2022

(87) PCT Pub. No.: WO2021/224716
PCT Pub. Date: Nov. 11, 2021

(65) Prior Publication Data
US 2023/0228918 A1    Jul. 20, 2023

Related U.S. Application Data

(60) Provisional application No. 63/021,756, filed on May 8, 2020.

(51) Int. Cl.
G02B 5/02        (2006.01)

(52) U.S. Cl.
CPC .......... *G02B 5/021* (2013.01); *G02B 5/0257* (2013.01); *G02B 5/0268* (2013.01); *G02B 5/0284* (2013.01); *G02B 5/0294* (2013.01)

(58) Field of Classification Search
None
See application file for complete search history.

(56) References Cited

U.S. PATENT DOCUMENTS

| 6,381,068 B1 | 4/2002 | Harada et al. | |
| 2006/0274244 A1* | 12/2006 | Battiato | B29C 55/16 |
| | | | 349/119 |

(Continued)

FOREIGN PATENT DOCUMENTS

KR    20140047412 A    4/2014

OTHER PUBLICATIONS

International Search Report for PCT Application No. PCT/IB2021/053423, mailed on Sep. 13, 2021, 7 pages.

*Primary Examiner* — Derek S. Chapel
(74) *Attorney, Agent, or Firm* — Jonathan L. Tolstedt

(57) ABSTRACT

An optically diffusive film includes an optical substrate layer with opposing first and second major surfaces; and an optical layer disposed on the second major surface of the optical substrate layer and including a structured major surface having a plurality of spaced apart elongated structures elongated along a same first direction and arranged at a substantially uniform density, each elongated structure including a peak such that, in a plane of a cross-section of the elongated structure that is parallel to the first direction and comprises the peak, the elongated structure has a substantially flat top region; wherein for substantially normally incident light and a visible wavelength range and an infrared wavelength range, the optical substrate layer has an (Continued)

average total transmittance or reflectance of greater than about 60% in the visible wavelength range and an average specular transmittance of greater than about 60% in the infrared wavelength range.

3 Claims, 18 Drawing Sheets

(56) References Cited

U.S. PATENT DOCUMENTS

| | | | | |
|---|---|---|---|---|
| 2015/0293272 A1* | 10/2015 | Pham | ................... | G02B 5/0268 |
| | | | | 205/95 |
| 2018/0203286 A1* | 7/2018 | Yang | ................ | B29D 11/00798 |
| 2020/0348557 A1* | 11/2020 | Kim | .................. | G02F 1/133528 |

\* cited by examiner

OPTICALLY DIFFUSIVE FILM WITH ELONGATED STRUCTURES

CROSS REFERENCE TO RELATED APPLICATIONS

This application is a national stage filing under 35 U.S.C. 371 of PCT/IB2021/053423, filed Apr. 26, 2021, which claims the benefit of U.S. Provisional Application No. 63/021,756, filed May 8, 2020, the disclosures of which are incorporated by reference in their entireties herein.

SUMMARY

In some aspects of the present description, an optically diffusive film is provided, including an optical substrate layer with opposing first and second major surfaces, and an optical layer disposed on the second major surface of the optical substrate layer. The optical layer may include a structured major surface facing away from the optical substrate layer which may include a plurality of spaced apart elongated structures. The elongated structures may be elongated along a same first direction and arranged at a substantially uniform density across the structured major surface. Each elongated structure may include a peak such that, in a plane of a cross-section of the elongated structure that is parallel to the first direction and includes the peak, the elongated structure has a length L1, and a height variation of less than about 5% across a substantially flat top region having a length d, such that the ratio of d/L1 is greater than or equal to about 0.15. For substantially normally incident light and a visible wavelength range from about 450 nanometers (nm) to about 650 nm and an infrared wavelength range from about 930 nm to about 970 nm, the optical substrate layer may have an average total transmittance or reflectance of greater than about 60% in the visible wavelength range, and an average specular transmittance of greater than about 60% in the infrared wavelength range.

In some aspects of the present description, an optically diffusive film is provided, including a unitary optical layer with a first major surface and an opposing structured second major surface including a plurality of spaced apart elongated structures. The elongated structures may be elongated along a same first direction and arranged at a substantially uniform density of between about 5 to 100 structures per square millimeter (mm) across the second major surface. Each elongated structure may include a peak such that a in a plane of a cross-section of the elongated structure that includes the peak and is parallel to the first direction, the elongated structure has a length L1, a height variation of less than about 5% across a substantially flat top region having a length d, such that the ratio of d/L1 is greater than or equal to about 0.15. The elongated structure may also have a full width at half maximum, W1, and in a second direction orthogonal to the first direction, the elongated structure may have a full width at half maximum, W2, such that the ratio of W2/W1 is less than or equal to about 0.6 or about 0.5 or about 0.4. A power spectral density of the structured second major surface may have a first peak along the first direction having a first peak intensity I1 and a second peak along the second direction having a second peak intensity I2, such that $1 \leq I1/I2 \leq 10,000$.

In some aspects of the present description, an optically diffusive film is provided, including a unitary optical layer including a first major surface and an opposing structured second major surface including a plurality of spaced apart elongated structures. The elongated structures may be elongated along a same first direction and arranged at a substantially uniform density of between about 5 to 100 structures per square mm across the second major surface. Each elongated structure may include a peak such that, in a plane of a cross-section of the elongated structure that includes the peak and is parallel to the first direction, the elongated structure may have a length L1, and a height variation of less than about 5% across a substantially flat top region having a length d, such that the ratio d/L1 is greater than or equal to about 0.15, and a full width at half maximum, W1, and in a second direction orthogonal to the first direction, the elongated structure has a full width at half maximum, W2, such that the ratio W2/W1 is less than or equal to about 0.6, or about 0.5, or about 0.4. An autocorrelation of the structured second major surface along the first direction may have a first peak at a smallest positive first distance having a first peak intensity J1, and a second peak at a next smallest positive second distance having a second peak intensity J2, such that J2 is greater than J1.

DETAILED DESCRIPTION

Figure 1:
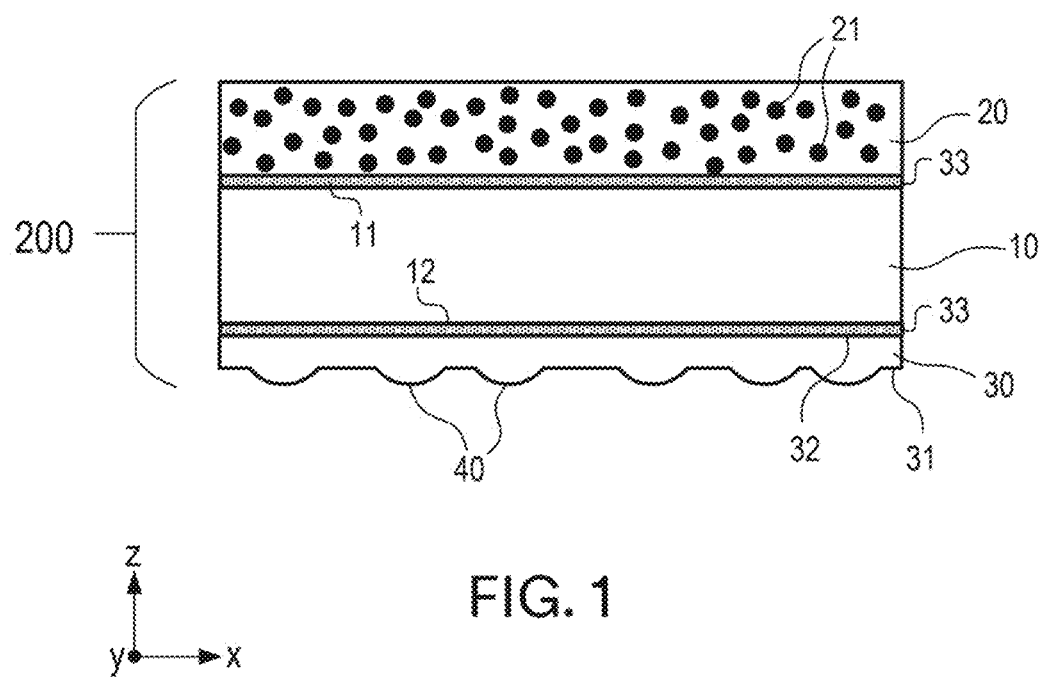
FIG. 1 is a side, cutaway view of an optically diffusive film, in accordance with an embodiment of the present description.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

LCD manufacturers are working on reducing the thickness of display and mobile devices, and are thus transitioning from the use of lightguide plates to thinner lightguide films. However, these lightguide films, which are commonly made of polycarbonate and may have micro-replicated structures on both sides, can be incompatible with adjacent films. For example, they may cause physical damage to adjacent films and/or reduced visual performance.

According to some aspects of the present description, a plurality of spaced-apart, elongated structures are disposed on an optical layer and may impart a surface roughness that lowers the coefficient of friction and eliminates or reduces damage to adjacent films, and which may prevent wet-out and moire patterns (e.g., Newton's rings) and similar effects between adjacent films. In some embodiments, these elongated structures may be printed onto an optical film, or may be created and placed by another process (e.g., microreplication). Controlling the size, shape, dimension, and uniformity of features may significantly affect the optical properties and functional performance of the final film.

According to some aspects of the present description, an optically diffusive film includes an optical substrate layer with opposing first and second major surfaces, and an optical layer disposed on the second major surface of the optical substrate layer. In some embodiments, the optical layer may include a structured major surface facing away from the optical substrate layer which may include a plurality of spaced apart elongated structures. In some embodiments, the elongated structures may have the appearance of an upside-down canoe, elongated in one direction (e.g., longer in an xz-plane of the film) and narrower in a second, orthogonal direction (e.g, narrower in a yz-plane of the film). In some embodiments, the elongated structures may be elongated along a same first direction (e.g., an x-axis of the film) and arranged at a substantially uniform density across the structured major surface. Each elongated structure may include a peak such that, in a plane of a cross-section of the elongated structure that is parallel to the first direction and includes the peak, the elongated structure has a length L1, and a height variation of less than about 5% or less than about 2.5% or less than about 1% across a substantially flat top region having a length d, such that the ratio of d/L1 is greater than or equal to about 0.15 or greater than or equal to about 0.10 or greater than or equal to about 0.05. In some embodiments, for substantially normally incident light and a visible (i.e., human-visible) wavelength range from about 450 nanometers (nm) to about 650 nm, and for an infrared wavelength range from about 930 nm to about 970 nm, the optical substrate layer may have an average total transmittance or reflectance of greater than about 60% or greater than about 65% or greater than about 70% in the visible wavelength range, and an average specular transmittance of greater than about 60% or greater than about 65% or greater than about 70% in the infrared wavelength range.

In some embodiments, the optical layer may have a unitary construction. That is, in some embodiments, the optical layer and the elongated structures disposed upon it may be formed from a single piece or material. In some embodiments, the optical layer may be formed from a process such as microreplication, it which the elongated structures are molded into a material which passes over a tooling (e.g., a roll material with cuts or divots which act as molds for the material). When this process is used, the tooling must often be prepared with a process which removes material from the tooling to create a smoother surface on which to create the mold features. This process can create a series of substantially parallel lines or grooves on the tooling, where a cutting tool has made passes on the tooling. In such embodiments, the structured major surface of the optical layer may include a plurality of substantially parallel linear structures in the regions between the elongated structures. In some embodiments, the substantially parallel linear structures may extend along the first direction and be arranged along the orthogonal second direction. In some embodiments, these substantially parallel linear structures may include a plurality of peaks with a plurality of valleys in between. In some embodiments, the average difference between the heights of the peaks and the valleys may be between about 10 nm and about 100 nm, or between about 10 nm and about 80 nm, or between about 10 nm and about 60 nm. In some embodiments, the elongated structures may be created using a printing process (e.g., flexographic, gravure, inkjet, or screen printing), in which the elongated structures are printed onto a substantially planar film or substrate. Stated another way, in some embodiments, an average peak-to-valley surface profile variation of the structured major surface of the optical layer in regions between the elongated structures may be between about 10 nm and about 100 nm, or between about 10 nm and about 80 nm, or between about 10 nm and about 60 nm.

In some embodiments, for substantially normally incident light and for each of mutually orthogonal first and second polarization states (e.g., linear p-polarized light and linear s-polarized light), the optical substrate layer may have an average specular transmittance of greater than about 60% or greater than about 65% or greater than about 70% in each of the visible and infrared wavelength ranges (e.g., the substrate is polyethylene terephthalate, or PET).

In some embodiments, for substantially normally incident light, the optical substrate layer may have an average total reflectance of greater than about 60% or greater than about 65% or greater than about 70% in the visible wavelength range for a first polarization state, may have an average total transmittance of greater than about 60% or greater than about 65% or greater than about 70% in the visible wavelength range for an orthogonal second polarization state, and may have an average specular transmittance of greater than about 60% or greater than about 65% or greater than about 70% in the infrared wavelength range for each of the first and second polarization states (e.g., the substrate is an infrared-transmissive reflective polarizer).

In some embodiments, for substantially normally incident light, and for each of the orthogonal first and second polarization states, the optical substrate layer may have an average total reflectance of greater than about 60% or greater than about 65% or greater than about 70% in the visible wavelength range, and may have an average specular transmittance of greater than about 60% or greater than about 65% or greater than about 70% in the infrared wavelength range (e.g., the substrate is an infrared-transmissive mirror film).

In some embodiments, the elongated structures may have an average length La along the first direction and an average width Wa along the orthogonal second direction, such that the ratio of La/Wa is greater than or equal to about 2 or about 2.5 or about 3, or about 3.5, or about 4, or about 4.5. In some embodiments, La may be greater than or equal to about 30 microns, and Wa may be less than or equal to about 15 microns. In some embodiments, the elongated structures may have an average peak height between about 1 micron and about 30 microns, or between 2 microns and about 20 microns, or between 2 microns and about 10 microns.

In some embodiments, the optically diffusive film may further include an optically diffusive layer disposed on the first major surface of the optical substrate layer. In some embodiments, the optically diffusive film may include a plurality of particles having an average size of between about 10 nm to about 300 nm. In some embodiments, each of the plurality of particles may include silica. In some embodiments, the optically diffusive layer may have average specular transmittances, Vs and Is, in the respective visible and infrared wavelength ranges, such that the ratio Is/Vs is greater than or equal to about 2.5. In some embodiments, for each of the first and second polarization states, the optically diffusive layer may have an average specular transmittance of greater than about 50%, or greater than about 60%, or greater than about 65%, or greater than about 70%, or greater than about 75%, in each of the visible and infrared wavelength ranges.

In some embodiments, the optical substrate layer of the optically diffusive film may include a plurality of particles having an average size of between about 10 nm to about 300 nm. In some embodiments, the particles may include silica. In some embodiments, for substantially normally incident light, the optical substrate layer may have average specular transmittances Vs and Is in the respective visible and infrared wavelength ranges, such that the ratio Is/Vs is greater than or equal to about 2.5.

According to some aspects of the present description, an optically diffusive film includes a unitary optical layer with a first major surface and an opposing structured second major surface including a plurality of spaced-apart elongated structures (e.g., canoe-shaped structures). The elongated structures may be elongated along a same first direction and arranged at a substantially uniform density of between about 5 to 100 structures per square millimeter (mm) across the second major surface. Each elongated structure may include a peak such that in a plane of a cross-section of the elongated structure that includes the peak and is parallel to the first direction, the elongated structure has a length L1, a height variation of less than about 5%, or about 2.5%, or about 1%, across a substantially flat top region having a length d, such that the ratio of d/L1 is greater than or equal to about 0.15, or about 0.10, or about 0.05.

In some embodiments, the elongated structure may also have a full width at half maximum, W1, and in a second direction orthogonal to the first direction, the elongated structure may have a full width at half maximum, W2, such that the ratio of W2/W1 is less than or equal to about 0.6 or about 0.5 or about 0.4. In some embodiments, a power spectral density of the structured second major surface may have a first peak along the first direction having a first peak intensity I1 and a second peak along the second direction having a second peak intensity I2, such that the ratio of I1/I2 is greater than or equal to 1, or greater than or equal to about 10, or greater than or equal to about 100, and less than or equal to about 10,000.

According to some aspects of the present description, an optically diffusive film includes a unitary optical layer including a first major surface and an opposing structured second major surface including a plurality of spaced apart elongated structures (e.g., canoe-shaped structures). In some embodiments, the elongated structures may be elongated along a same first direction and arranged at a substantially uniform density of between about 5 to 100 structures per square mm across the second major surface. In some embodiments, each elongated structure may include a peak such that, in a plane of a cross-section of the elongated structure that includes the peak and is parallel to the first direction, the elongated structure may have a length L1, and a height variation of less than about 5%, or less than about 2.5%, or less than about 1%, across a substantially flat top region having a length d, such that the ratio d/L1 is greater than or equal to about 0.15, or greater than or equal to about 0.10, or greater than or equal to about 0.05, and a full width at half maximum, W1, and in a second direction orthogonal to the first direction, the elongated structure has a full width at half maximum, W2, such that the ratio W2/W1 is less than or equal to about 0.6, or about 0.5, or about 0.4. In some embodiments, an autocorrelation of the structured second major surface along the first direction may have a first peak at a smallest positive first distance having a first peak intensity, J1, and a second peak at a next smallest positive second distance having a second peak intensity, J2, such that J2 is greater than J1. In some embodiments, the next smallest positive second distance is substantially equal to about twice the smallest positive first distance.

In some embodiments, the autocorrelation of the structured second major surface along the first direction may have the first peak at the smallest positive first distance having the first peak intensity, J1, and a plurality of other peaks at other positive distances greater than the smallest positive first distance having corresponding peak intensities, such that each of the corresponding peak intensities is greater than J1. In some embodiments, if d1 represents the smallest positive first distance, each of the other positive distances is substantially equal to m*d1, where m is a positive integer. In some embodiments, an autocorrelation of the structured second major surface along the second direction may have no peaks or a peak at a smallest positive third distance not less than the smallest positive first distance.

Turning now to the figures, FIG. 1 provides a side, cutaway view of an optically diffusive film, according to the present description, An optically diffusive film 200 includes an optical substrate layer 10 with a first major surface 11 and a second major surface 12, and an optical layer 30 disposed on the second major surface 12 of the optical substrate layer 10. In some embodiments, an adhesive layer 33 may be disposed between the optical layer 30 and optical substrate layer 10. In some embodiments, the optical layer 30 may have a structured major surface 31 and an unstructured major surface 32. In some embodiments, the structured major surface 31 may face away from the optical substrate layer, and may include a plurality of spaced-apart elongated structures 40.

In some embodiments, the elongated structures 40 may be canoe-shaped, elongated along a first direction (e.g., the x-direction, as shown in FIG. 1) and arranged at a substantially uniform density across the structured major surface 31. In some embodiments, the optically diffusive film 200 may further include an optically diffusive layer 20 disposed on the first major surface 11 of the optical substrate layer 10. In some embodiments, an adhesive layer 33 may be disposed between the optically diffusive layer 20 and optical substrate layer 10. In some embodiments, optically diffusive layer 20 may include a plurality of particles 21. In some embodiments, particles 21 may have an average size of between about 10 nm to about 300 nm. In some embodiments, particles 21 may include silica, and may provide a diffusing (scattering effect) to at least some wavelengths of light.

Figure 2:
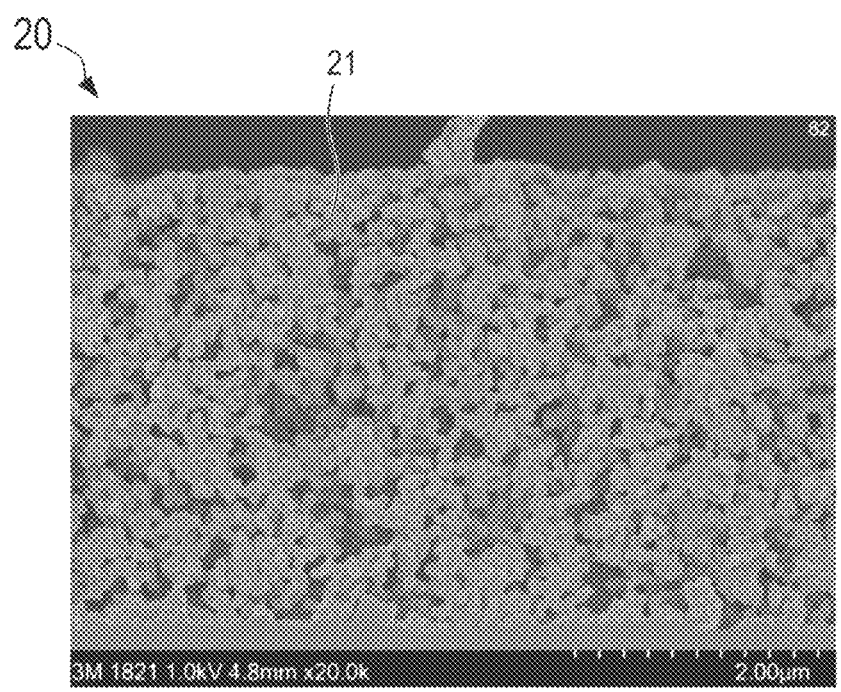
FIG. 2 is a picture of the particles of an optically diffusive layer, in accordance with an embodiment of the present description.

FIG. 2 is a magnified image of the particles 21 of optically diffusive layer 20 of FIG. 1. In some embodiments, particles 21 may be selected such that optically diffusive layer 20 may have an average specular transmittance Vs in a human-visible (or "visible") wavelength ranges from about 450 nm to about 650 nm, and an average specular transmittance Is in an infrared wavelength range from about 930 nm to about 970 nm, such that the ration of Is/Vs is greater than or equal to about 2.5. Stated another way, the optically diffusive layer 20 may scatter some visible wavelengths of light more than some infrared wavelengths of light, enabling, for example, the use of an infrared sensor to detect infrared images passing through the optically diffusive film 200 (e.g., an infrared fingerprint sensor beneath an optical display).

Figure 3:
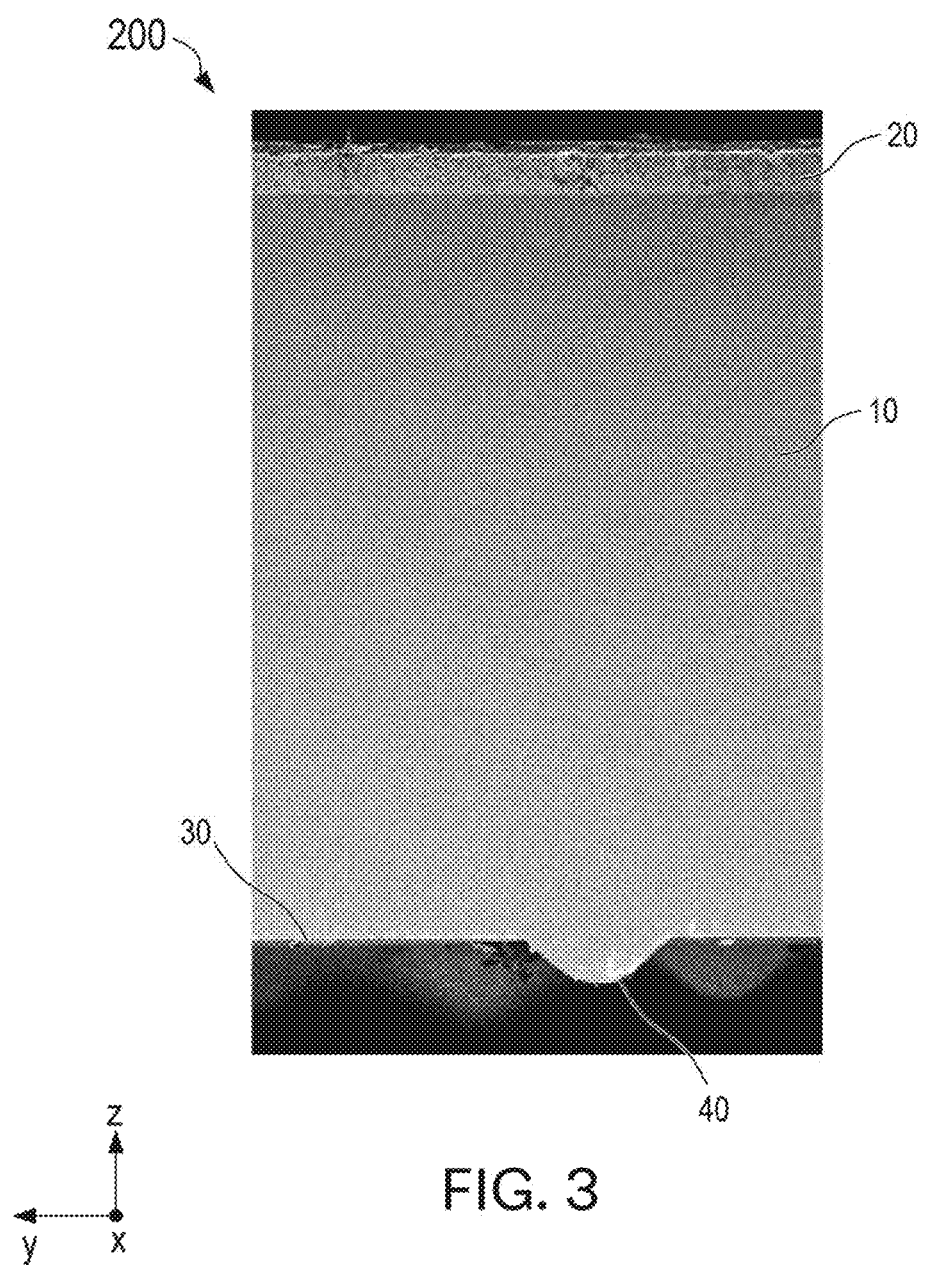
FIG. 3 is a close-up image of the layers of an optically diffusive film, in accordance with an embodiment of the present description.

FIG. 3 is a magnified image of the layers of optically diffusive film 200 of FIG. 1, showing one embodiment of layer relative dimensions from an example film. In the embodiments of FIG. 3, optically diffusive film 200 includes an optical substrate layer 10 (e.g., a layer of PET, a reflective polarizer, an infrared-transmissive film, etc.), and an optical layer 30 featuring a plurality of elongated structures 40. In the embodiment of FIG. 3, the optically diffusive film 200 further includes an optically diffusive layer 20 (e.g., the optically diffusive layer of FIGS. 1-2).

Figure 4:
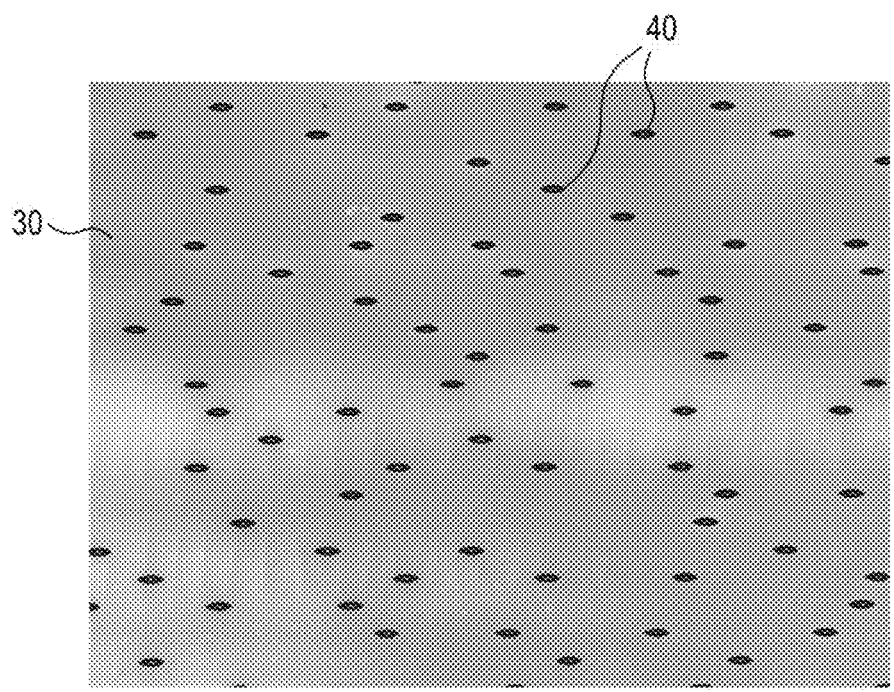
FIG. 4 is an image of the spaced-apart elongated structures on an optical film, in accordance with an embodiment of the present description.
Figure 4:
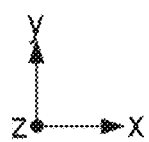

FIG. 4 provides an image of a top view of the spaced-apart elongated structures 40 on an optical layer 30, such as optical layer 30 of FIG. 1. The elongated structures 40 may be disposed with an irregular, random pattern, such as the pattern shown in FIG. 4, or optionally in a regular array or pattern (not shown). In some embodiments, the elongated structures 40 are elongated (i.e., they have their longest dimension) along a first direction, such as the x-axis as shown in FIG. 4, and are arranged along an orthogonal, second direction, such as the y-axis as shown in FIG. 4. The assignment of the coordinate/reference system (i.e., the x, y, and z directions) depicted in FIG. 4 is an example only for discussion purposes, and other reference systems and arrangements may be used while still being consistent with the present disclosure.

Figure 5A:
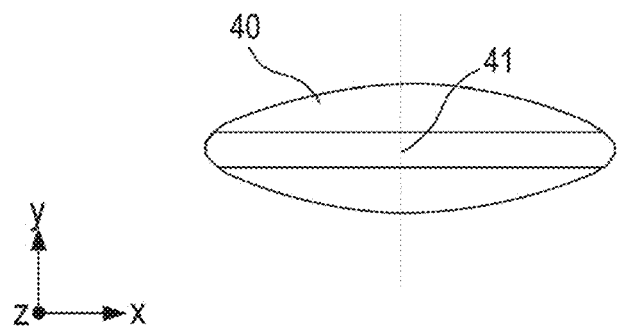
FIGS. 5A-5C provide detailed graphs of the shape and configuration of elongated structures, in accordance with an embodiment of the present description.
Figure 5B:
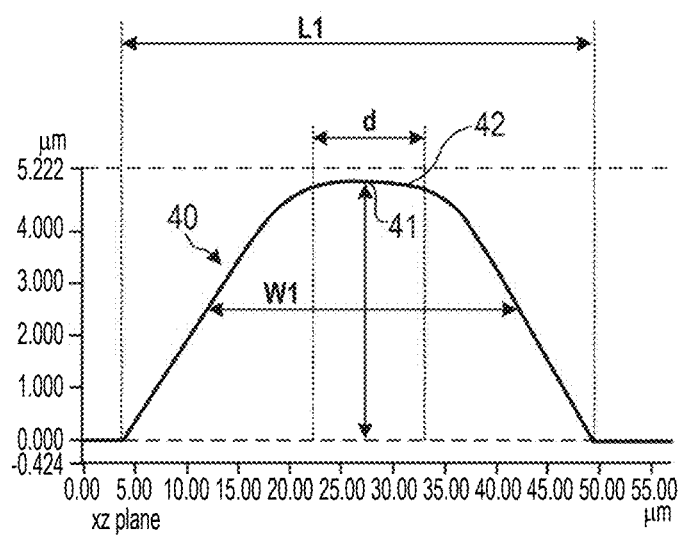
Figure 5C:
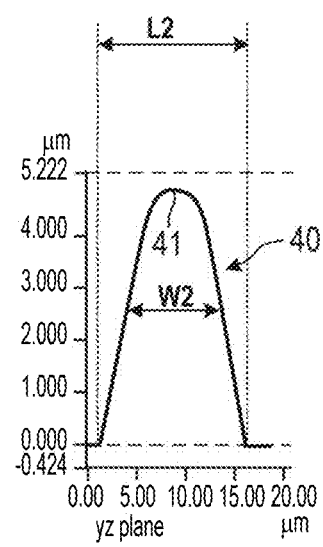

FIGS. 5A-5C provide detailed graphs of the shape and configuration of the elongated structures, and should be examined together for the following description. FIG. 5A is a top view of one embodiment of an elongated structure 40, including a peak (i.e., a highest point of the curve) 41. FIG. 5B shows a plot of the profile view as taken through the xz-plane (e.g., as shown by the reference system of FIG. 1), showing a side view of the "canoe" shape (the length dimension). FIG. 5C shows a plot of the profile view as taken through the yz-plane, showing a front view of the "canoe" shape (the width dimension). Looking at FIG. 5B, in some embodiments, the elongated structure 40 has a length L1 and a full width at half maximum (FWHM, or the width seen at half height of the elongated structure 40) W1. In some embodiments, the elongated structure 40 may have a substantially flat top region 42 with a length d, such that the height variation across the length of d is less than about 5%, or less than about 2.5%, or less than about 1%. In some embodiments, the ratio of d/L1 is greater than or equal to about 0.15, or greater than or equal to about 0.10, or greater than or equal to about 0.05. Turning to FIG. 5C, in some embodiments, elongated structure 40 may have a total length L2 (i.e., length in the yz plane) and an FWHM W2, such that the ratio of W2/W1 is less than or equal to about 0.6, or less than or equal to about 0.5, or less than or equal to about 0.4. FIGS. 5A-5C show one possible embodiment of shape, size, and configuration for an elongated structure 40, but are not meant to be limiting. The values on the plots of FIGS. 5B-5C are in microns (μm), and the curves shown in the figures do not necessarily represent an aspect ratio of an actual elongated structure 40 (i.e., the figures provide actual measured data of one embodiment but the plot lines are not necessarily meant to be realistic depictions of an elongated structure 40; for example, the x-axis has been compressed to be able to present the graph on a single page and maintain legibility).

Figure 6A:
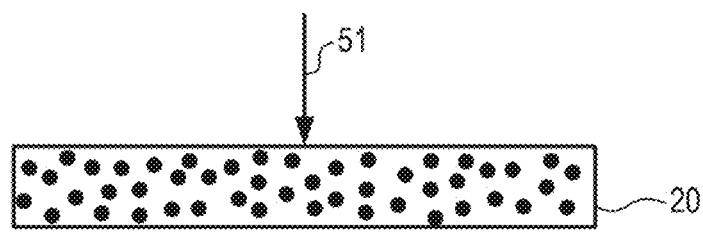
FIGS. 6A-6C illustrate normally-incident light striking layers of an optically diffusive film, in accordance with an embodiment of the present description.
Figure 6B:
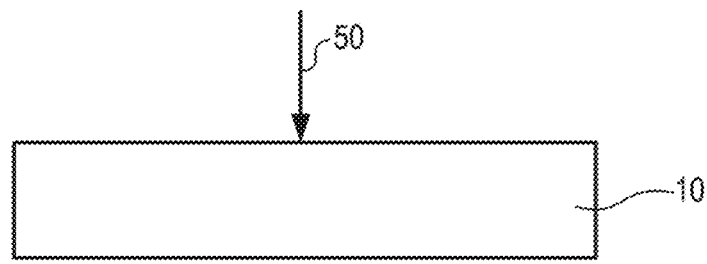
Figure 6C:
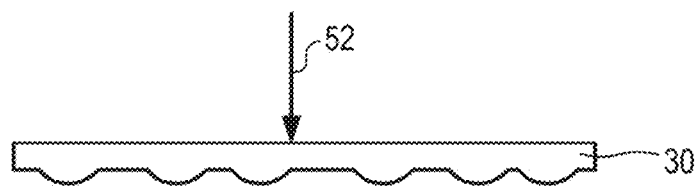

FIGS. 6A-6C provide definitions for normally-incident light striking layers of an optically diffusive film, as the term is used in the claims and corresponding detailed description. FIG. 6A shows normally-incident light 51 impinging on optically diffusive layer 20. FIG. 6B shows normally-incident light 50 impinging on optical substrate layer 10. FIG. 6C shows normally-incident light 52 impinging on optical layer 30.

Figure 7A:
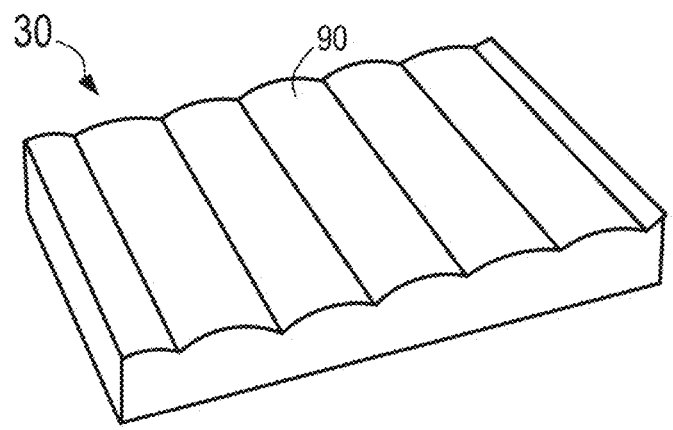
FIGS. 7A-7C illustrate surface features of a unitary optical layer, in accordance with an embodiment of the present description.
Figure 7B:
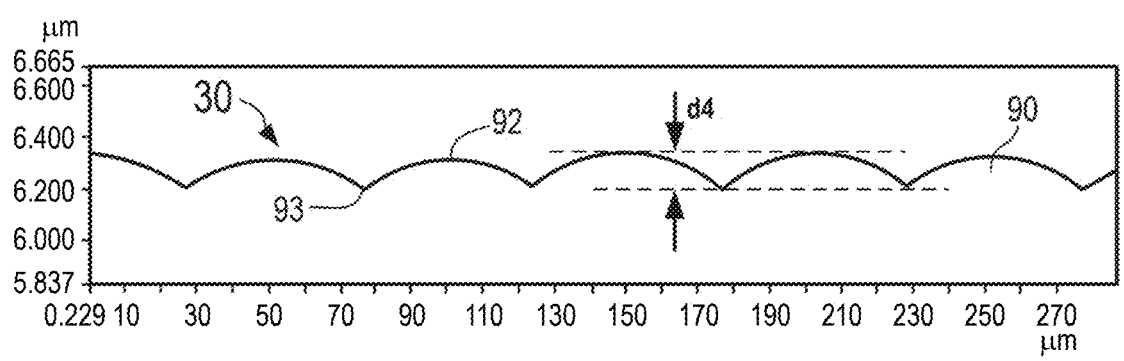
Figure 7C:
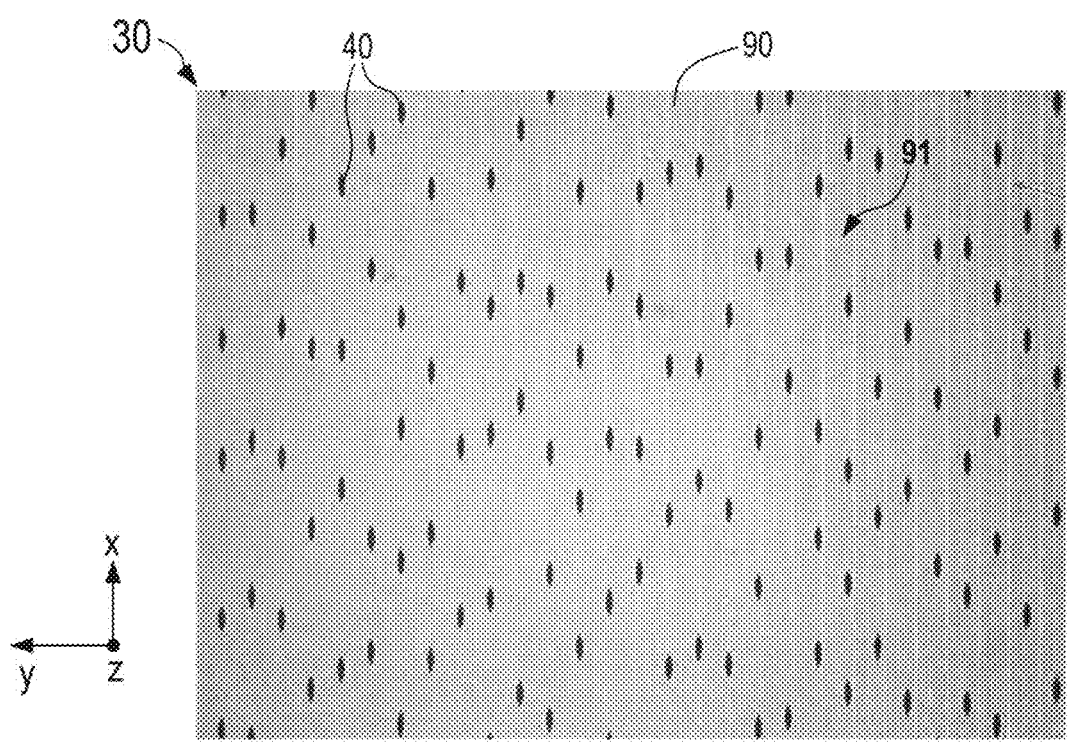

FIGS. 7A-7C illustrate surface features of a unitary optical layer prepared using a microreplication process, according to the present description. FIG. 7A depicts a portion of an optical layer 30 featuring a plurality of substantially parallel linear structures 90 created by a microreplication process. In some embodiments, creating a film with a microreplication process involves creating a template or master tooling, which may take the form of a roll material with periodic surface features (e.g., shaped depressions, cuts, or concave areas, or shaped protrusions or convex structures). A soft material may then be passed between the roll material and a second roller or surface, and the periodic surface features on the roll material create corresponding features on the material passing through which are essentially the negative of the features on the roll material surface. For example, a canoe-shaped depression on the roll material will create a corresponding canoe-shaped structure or projection on the surface of the material. As the material passes through the system, it may be cured (e.g., cured with ultraviolet light or heat) to create a structured film.

Before the periodic surface features can be cut into the surface of the roll material, the outer surface of the roll material must often be prepared using a process where the initial rough outer surface of the roll material is taken off by pressing a hardened tool into the surface of the roll material to cut away the surface in a sequence of passes. Although the outer surface of the roll material is much smoother after this process, the tool used in the face-off process can create very small grooves or ruts in the surface of the roll material. The small grooves remain on the surface of the roll material, even after the periodic surface features are cut or otherwise created on the surface of the roll material. These very small grooves in the roll material create corresponding negative ridges in the film that is created, such as the substantially parallel linear structures 90 shown in optical layer 30 in FIG. 7A. These linear structures 90, as shown in FIG. 7B, are relatively small, and, in some embodiments, the average difference between heights of the peaks 92 and the valleys 93, d4, may be between about 10 nm and about 100 nm, or about 80 nm, or about 60 nm. Comparing this average height difference d4 to the height of a typical elongated structure 40, as shown in FIG. 5B, which is, in some embodiments, around 5 microns, it is seen that the relative height of the linear structures 90 is significantly less than the average height of an elongated structure 40.

FIG. 7C provides an image showing a top view of an optical layer 30 created using a microreplication process. Faint lines on the image of optical layer 30 are created by differences in illumination created by the alternating peaks 92 and valleys 93 (see FIG. 7B) of the substantially parallel linear structures 90. The surface of optical layer 30, therefore, includes a plurality of elongated structures 40 with substantially parallel linear structures 90 formed in the regions 91 between elongated structures 40. The linear structures 90 extend along the same direction as the elongated structures 40 (e.g., the x-direction as shown in FIG. 7C) and both the linear structures 90 and elongated structures 40 are arranged along an orthogonal second direction (e.g., the y-direction as shown in FIG. 7C).

Figure 8A:
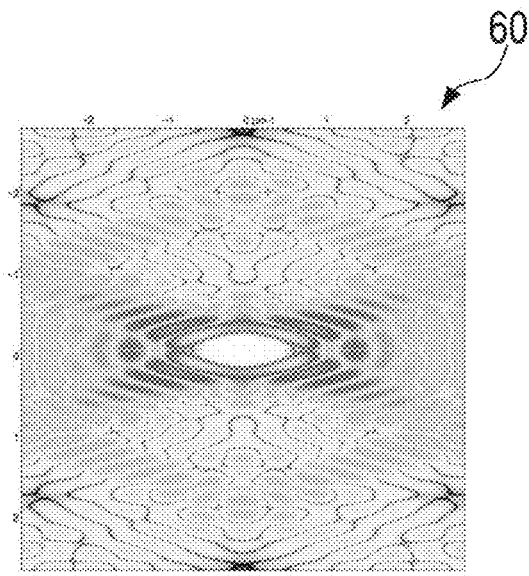
FIGS. 8A-8C provide plots of a power spectral density of a structured surface of a unitary optical layer, in accordance with an embodiment of the present description.
Figure 8B:
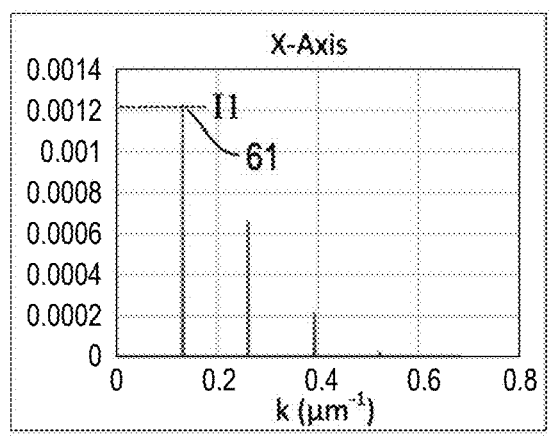
Figure 8C:
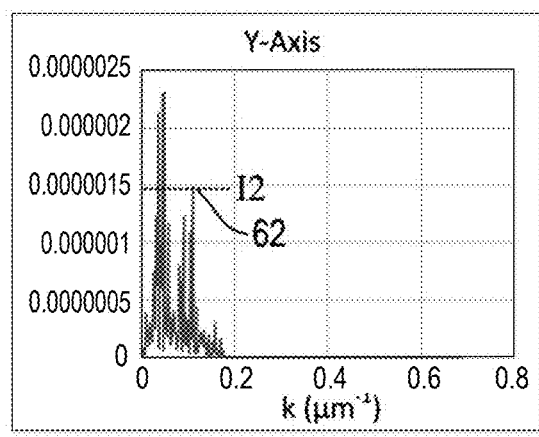
Figure 9A:
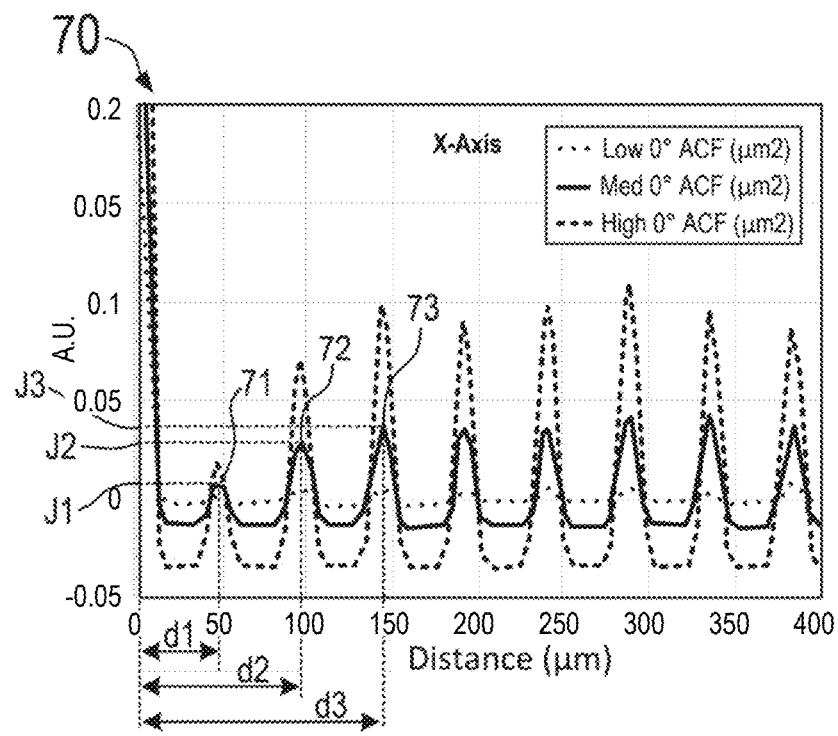
FIGS. 9A-9B provide plots of an autocorrelation of a structured surface of a unitary optical layer, in accordance with an embodiment of the present description.
Figure 9B:
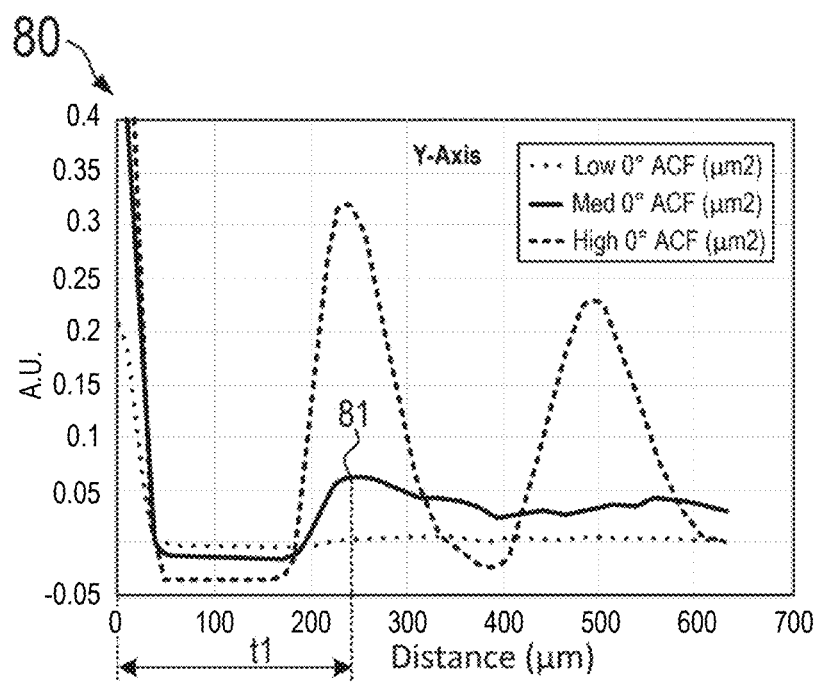

There are mathematical and scientific methods that allow us to measure and characterize the uniformity or regularity of the elongated structures on the optical layer, providing a way to characterize the films structure and performance. FIGS. 8A-8C provide plots of a power spectral density of a structured surface of a unitary optical layer with elongated structures. FIGS. 9A-9B provide plots of an autocorrelation of a structured surface of a unitary optical layer with elongated features. FIG. 8A shows an image of a power spectral density (PSD) performed on the structured surface of the optical layer, and FIGS. 8B and 8C show plots of the intensities measured by the PSD on the x-axis and the y-axis, respectively. FIG. 8A shows a first peak 61 along a first direction (e.g., the x-axis) having a first peak intensity I1, and FIG. 8B shows a second peak 62 along a second direction (e.g., the y-axis) having a second peak intensity I2. In some embodiments, the ratio I1/I2 is greater than or equal to about 1 (or greater than or equal to about 10, or greater than or equal to about 100) and less than or equal to about 10,000.

FIGS. 9A and 9B provide the results of an autocorrelation performed on the structured surface of the optical layer. FIG. 9A shows an autocorrelation 70 along the first direction (e.g., the x-axis) showing a first peak 71, a second peak 72, and a third peak 73, located respectively at a first (smallest) distance d1, a second (next smallest) distance d2, and a third (third smallest) distance d3. First peak 71 has a first peak intensity J1, second peak 72 has a second peak intensity J2, and third peak 73 has a third peak intensity J3. In some embodiments, each of the second peak intensity J2 and the third peak intensity J3 are greater than the first peak intensity J1. FIG. 9B shows an autocorrelation 80 along the second direction (e.g., the y-axis) showing either no significant peaks or a peak 81 at a distance t1 that is not less than the first distance d1.

EXAMPLES

Optically diffuse films with elongated microstructures on the back of the film were prepared as described herein. Microstructures with multiple dimensions and distributions were prepared to enable anti-wet out features on the back of the diffuser film used in display devices such as a smart phone.

All parts, percentages, ratios, etc., in the examples and the rest of the specification are by weight, unless noted otherwise. The following abbreviations are used herein: g=gram, mol=molar, mm=millimeters; cm=centimeters; um=micrometers, kPa=kilo Pascals, ° C.=Degree Celsius, mins=minutes, hrs=hours, mg=milligram, ft=feet, s=seconds, nm=nanometer, psi=per square inch, =degrees, IR=Infra-Red, UV=Ultraviolet, and =machine direction, td=transverse direction, ppm=parts per million, g=gram, DSC=Differential Scanning calorimeter, OD=Outside Diameter, Wt %=Weight percentage. A summary of the materials used in the examples herein is provided in Table 1.

TABLE 1

Materials Used in the Examples.

| Abbreviation | Description and Source |
| --- | --- |
| A-174 | 3-methacryloxypropyl-trimethoxysilane obtained under the trade designation Silquest A-174 from Momentive, Waterford, NY |
| SR 444 | Pentaerythritol triacrylate, a low volatile and fast curing monomer available from Stratomer Arkema, Exton PA. |
| Nalco 2329 | Silica particles (with an average particle size of 75 nm) obtained under the trade name Nalco 2329 from Nalco Chemical Company, Naperville, IL. |
| Irgacure 184 | Photo initiator, available from BASF, Vandalia, IL. |
| Irgacure 819 | Photo initiator, available from BASF, Vandalia, IL. |
| 4H-TMP | 4-hydroxy-2,2,6,6-tetramethylpiperidine 1-oxyl available from Sigma Aldrich, Milwaukee, WI. |
| Propanol | 1-methoxy-2- propanol available from Sigma Aldrich, Milwaukee, WI. |
| IPA | Isopropyl alcohol available from Sigma Aldrich, Milwaukee, WI |
| HDDA | 1,6 HEXANEDIOL DIACRYLATE Stratomer available as SR238 B from Arkema, Exton, PA. |
| TMPTA | TRIMETHYLOLPROPANE TRIACRYLATE available as SR351 Stratomer Arkema, Exton, PA. |
| TPO | Diphenyl (2,4,6-trimethylbenzoyl)-phosphine oxide available as DAROCUR TPO from BASF, Vandalia, IL. |
| Photomer 6210 | Aliphatic Urethane Acrylate Oligomer available from IGM Resins, Charlotte, NC. |

Preparation of Diffuse Coating on Optical Substrate Layer:

First, a coating precursor solution was prepared as follows. 5.95 gm of A-174 and 0.5 gm of 5 wt. %; 4H-TMP were added to the mixture of 400 gm NALCO 2329 and 450 grams of propanol in a glass jar with stirring at room temperature for 10 mins. The jar was sealed and placed in an oven at 80° C. for 16 hrs. Then, the water was removed from the resultant solution with a rotary evaporator at 60° C. until the solid content of the solution was close to 45 wt. %. 200 grams of propanol was charged into the resultant solution, and then remaining water was removed by using the rotary evaporator at 60° C. This latter step was repeated for a second time to further remove water from the solution. Finally, the concentration of NALCO 2329 silica nanoparticles was adjusted to yield a 42.5 wt. % surface functionalized silica nanoparticles by adding appropriate amount of propanol.

Next, a coating solution "A" was made. The coating solution "A" was composed of 27.98 wt. % of the clear precursor solution described above, 7.9 wt. % of SR444, 63.3 wt. % IPA, 0.8 wt. % Irgacure 184 and 0.02 wt. % Irgacure 819. Coating solution "A" was pumped with a Viking CMD (available from Viking Pump, Cedar Falls, IA) pump to a slot-type coating die at a rate that produced a wet layer thickness of 15 □m onto a primed polyester used as optical substrate.

Next, the coating was polymerized by passing the coated substrate through a UV-LED cure chamber that included a quartz window to allow passage of UV radiation. The UV-LED cure chamber included a rectangular array of UV-LEDs. The LEDs (available from Nichia Inc., Tokyo Japan) operated at a nominal wavelength of 385 nm and were run at 8 Amps, resulting in a UV-A dose of 0.035 joules per square cm. The water-cooled UV-LED array was powered by a Genesys 150-22 power supply (available from TDK-Lambda, Neptune NJ). The UV-LEDs were positioned above the quartz window of the cure chamber at approximately 2.5 cm from the substrate. The UV-LED cure chamber was supplied with a flow of nitrogen at a flow rate of 22 cubic feet per minute in order to keep the oxygen level below 50 parts ppm. The oxygen level in the UV-LED cure chamber was monitored using a Series 3000 oxygen analyzer (available from Alpha Omega Instruments, Cumberland RI).

After being polymerized by the UV-LEDs, the solvent in the cured coating was dried in an oven at 150° F. (66° C.) 66° C. for 30 seconds. Next, the dried coating was post cured using a Fusion System Model 1600 configured with a H-bulb (available from Fusion UV Systems, Gaithersburg, MD). The UV Fusion chamber was supplied with a flow of nitrogen that resulted in an oxygen concentration of approximately 50 ppm in the chamber. This resulted in a diffuse film on an optical substrate. The cross-sectional scanning electron microscope image of the representative diffuse layer is shown in FIG. 3.

The visible transmission (% T), haze (% H) and clarity (% C) of the resulting film were measured using a haze meter (Haze-Gard Plus, BYK-Gardner, Columbia, MD). The measured values of transmission, haze and clarity were 87.5%, 80.4% and 97.8% respectively. This diffuser film was used as input film for micro-replication on the back side of the substrate Fabrication of Anti-Wet Out (AWO) Microstructures on the Optical Substrate Layer with Diffuse Coating:

Microstructures with different dimensions were fabricated on the back side (i.e. the side opposite to diffuse coating) using roll-to-roll micro-replication following the process as described below.

Design of Experiment. Below is the setup for the microreplicated AWO structure design of experiment for the diffuse film.

Designed Variables are:
 1. X1: Tip radius of the AWO features is in the unit of um
 2. X2: Feature density is in the unit of the numbers of features per mm2

Fixed Variables are:
 1. AWO feature height is fixed of 5 microns (um)
 2. AWO feature included angle of 90 degrees The full design of experiment is shown in Table 2.

TABLE 2

Full Design of Experiment.

| Designed variable | Design 1 | Design 2 | Design 3 | Design 4 | Design 5 | Design 6 |
|---|---|---|---|---|---|---|
| X1, um | 1 | 1 | 1 | 5 | 5 | 5 |
| X2, features/mm2 | 20 | 50 | 80 | 20 | 50 | 80 |

AWO Structure, and Ultraprecision Machining Program Designs

Figure 10A:
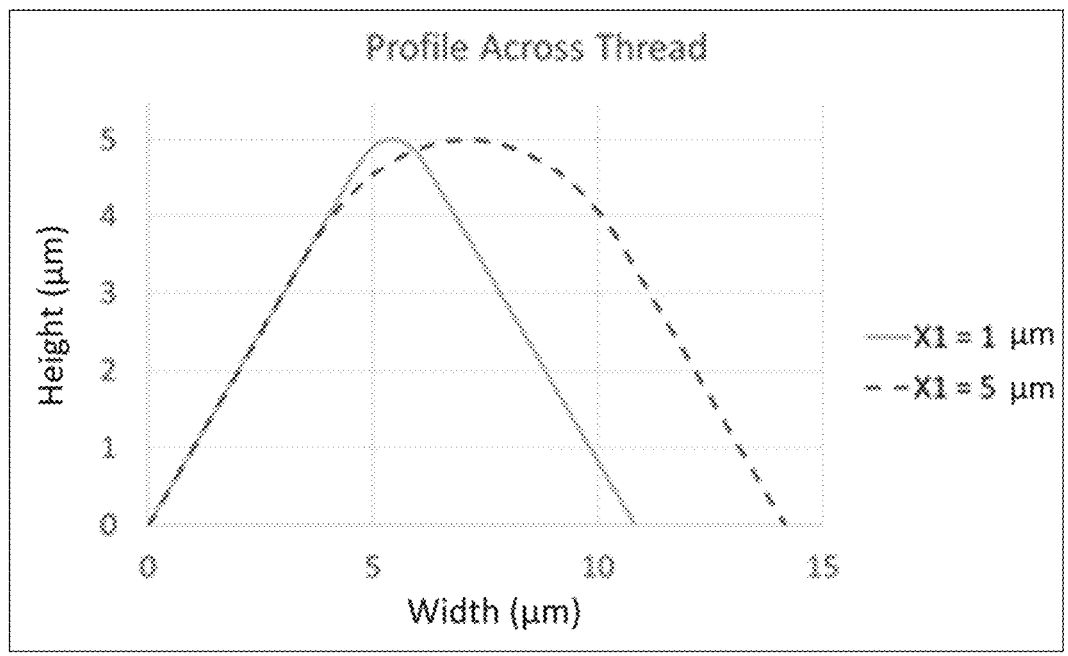
FIGS. 10A-10B show the profiles of an example feature along a first and second direction, in accordance with an embodiment of the present description.
Figure 10B:
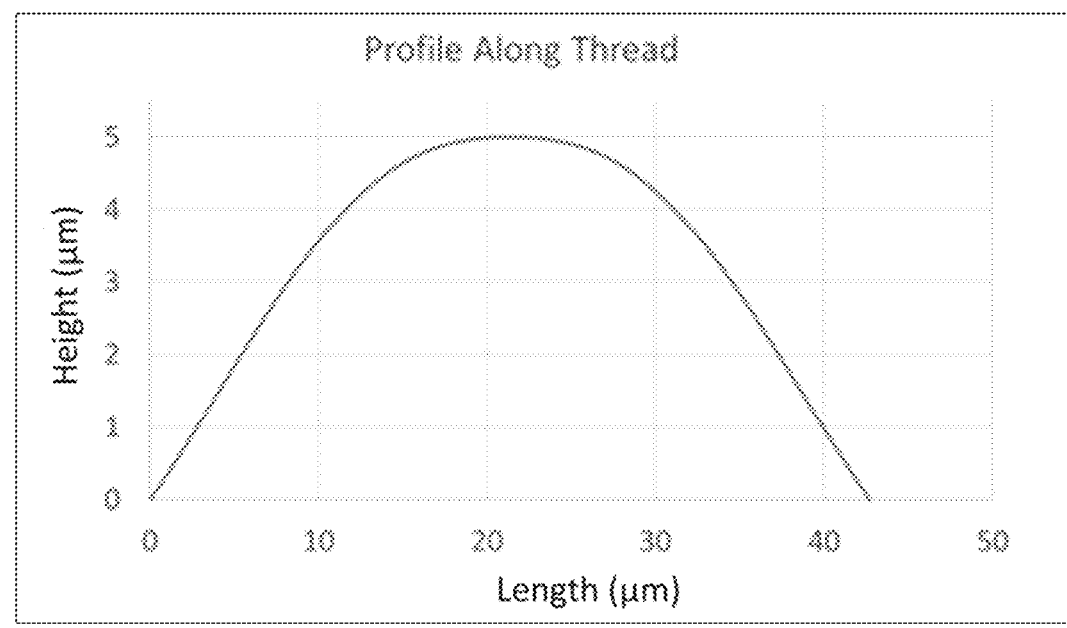

The anti-wet out (AWO) structures were designed to provide a smooth profile to the ultraprecision machining while also providing an adequate height and shape to provide anti wet-out functionality. In this case the features were designed to have a maximum height of 5 um. The included angle of each feature is 90 degrees. The X1 design variable dictated the rounding at the tip of each feature. The designed feature profiles across the thread direction and along it are shown in FIGS. 10A and 10B, respectively.

The layout of the features both down and across the tooling was determined using a randomization algorithm with the primary settings shown in Table 3.

TABLE 3

Layout of Features on Tooling.

|  | X2 = 20 features/mm$^2$ | X2 = 50 features/mm$^2$ | X2 = 80 features/mm$^2$ |
|---|---|---|---|
| Maximum cutting angle (deg) | 21 | 21 | 21 |
| Minimum spacing in thread direction (um) | 140.33 | 140.33 | 105.82 |
| Feature Length (um) | 42.9 | 42.9 | 42.9 |
| Feature Width (um) at X1 = 1 um | 10.8 | 10.8 | 10.8 |
| Feature Width (um) at X1 = 5 um | 14.2 | 14.2 | 14.2 |
| Pattern Width (mm) | 279.5 | 279.5 | 279.5 |

Figure 11A:
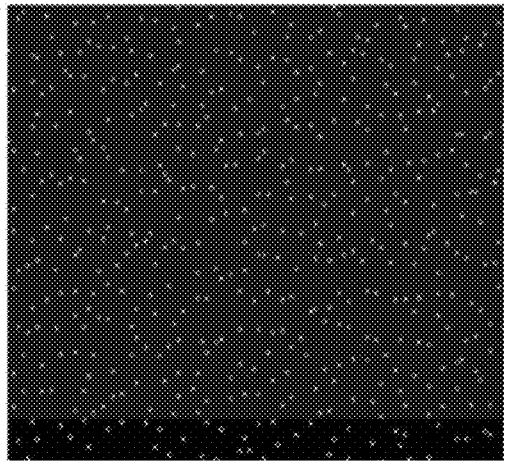
FIGS. 11A-11C show small subsets of a designed layout for the three example values of feature density, in accordance with an embodiment of the present description.
Figure 11B:
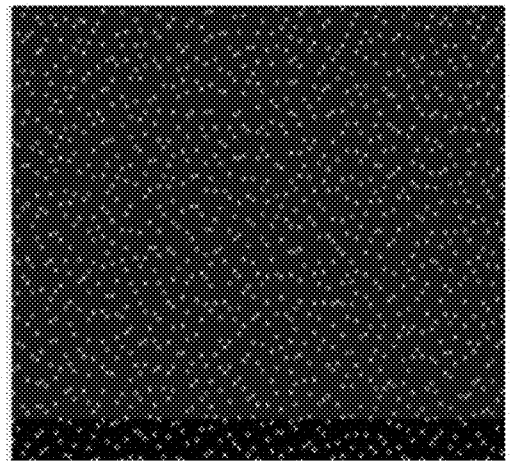
Figure 11C:
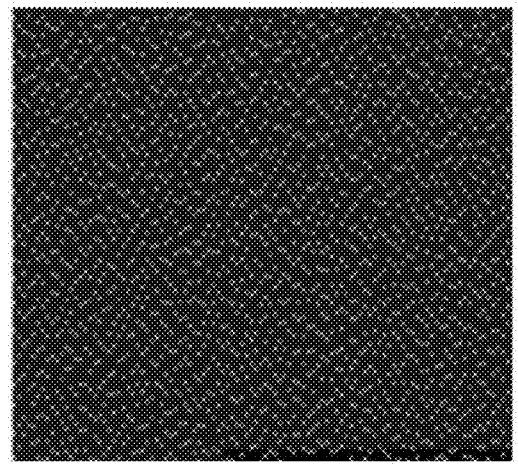

The algorithm creates a significantly randomized pattern while minimizing clumping of feature and large areas without features. The algorithm was set such that density in features per square millimeter met the design variable X2. FIGS. 11A-11C show small subsets (5 mm×5 mm) of the designed layout for the three values of X2. FIG. 11A shows an X2 value of 20. FIG. 11B shows an X2 value of 50. FIG. 11C shows an X2 value of 80.

The completed designs were analyzed to confirm that the design targets were reached. The actual values in the designs are provided in Table 4.

TABLE 4

Values in Completed Designs.

|  | X2 = 20 feat/mm$^2$ | X2 = 50 feat/mm$^2$ | X2 = 80 feat/mm$^2$ |
|---|---|---|---|
| Actual density (features/mm$^2$) | 21.13 | 50.31 | 81.58 |
| Surface Coverage % at X1 = 1 um | 0.67 | 1.59 | 2.58 |
| Surface Coverage % at X1 = 5 um | 0.95 | 3.86 | 6.26 |
| Total # features in design | 7,181,700 | 35,908,494 | 58,227,616 |

In the table above surface coverage % is a measure of the base area of a feature multiplied by the number of features, divided by the total area.

Ultraprecision machining process to create tooling and metrology results. It takes an ultraprecision machining process to create discrete concave features on the smooth surface of roll material. The micro-structure achieves height uniformity within the micro-meter level. It is also typically desired to make more than 100 million features on the roll material surface with meaningful productivity for scale-up mass production.

Four feature examples are provided to illustrate the creation of these features as shown in the confocal metrology images. The confocal metrology is taken on a soft material replicating the concave feature.

Top view of elongated feature.
   A plot of the profile view as taken through the xz-plane (in a plane of a cross-section of the elongated structure that includes the peak and is parallel to the first direction).
   A plot of the profile view as taken through the yz-plane (and in a second direction orthogonal to the first direction).

Figure 12A:
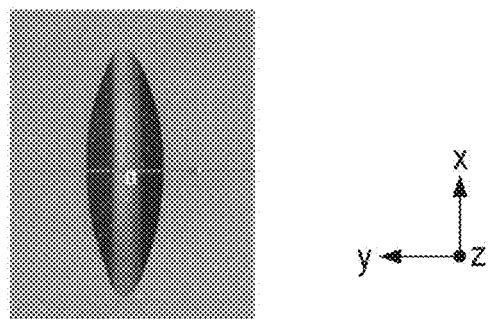
FIGS. 12A-12C provide data for an example feature with a 5-micron height and substantially flat top region, in accordance with an embodiment of the present description.
Figure 12B:
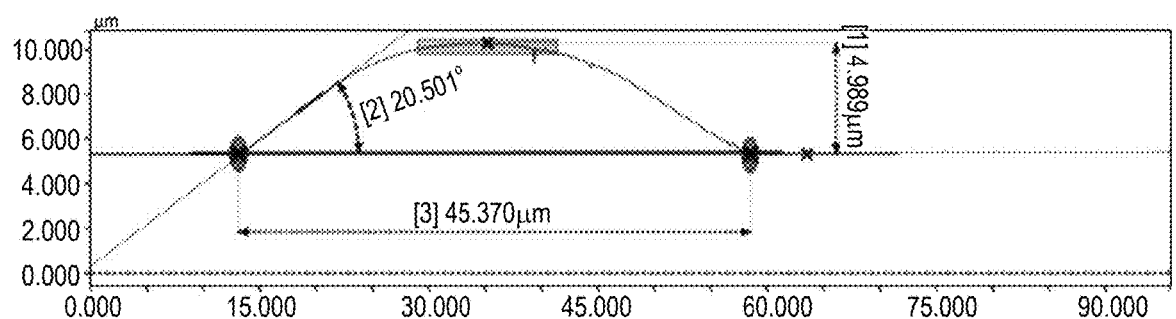
Figure 12C:
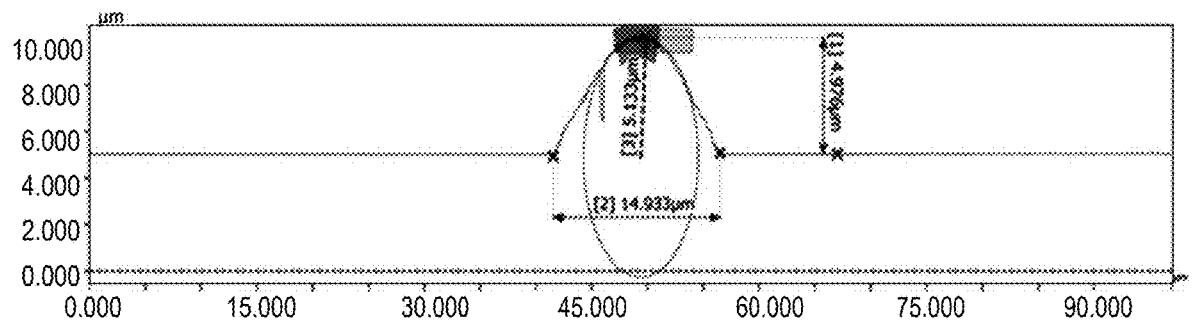

Example 1: FIGS. 12A-12C. FIG. 12A provides an image of a feature with a 5-micron height and substantially flat top region. FIG. 12B shows a plot of the profile view as taken through the yz-plane. FIG. 12C shows a plot of the profile view as taken through the xz-plane.

Figure 13A:
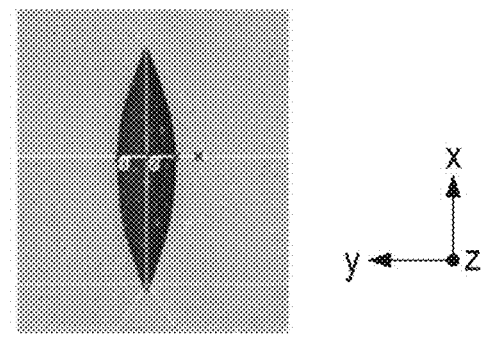
FIGS. 13A-13C provide data for an example feature with a 5-micron height and substantially flat top region and a sharp peak, in accordance with an embodiment of the present description.
Figure 13B:
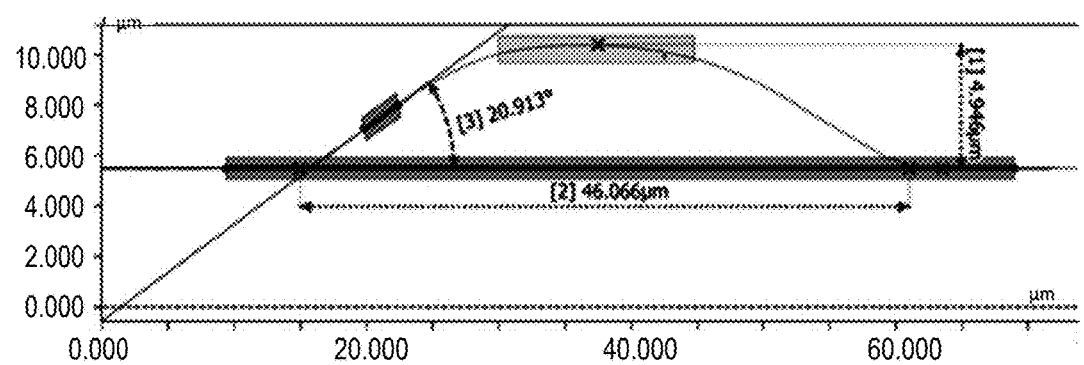
Figure 13C:
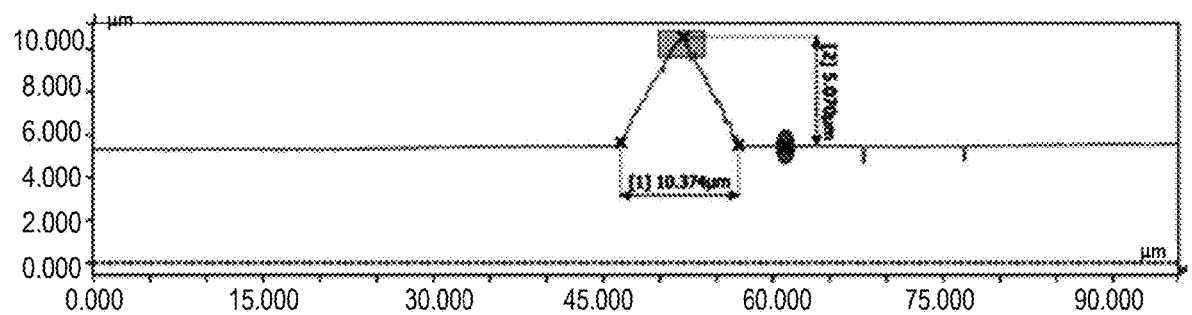

Example 2: FIGS. 13A-13C. FIG. 13A provides an image of a feature with a 5-micron height and substantially flat top region, with a sharp peak in a second direction orthogonal to the first direction. FIG. 13B shows a plot of the profile view as taken through the yz-plane. FIG. 13C shows a plot of the profile view as taken through the xz-plane.

Figure 14:
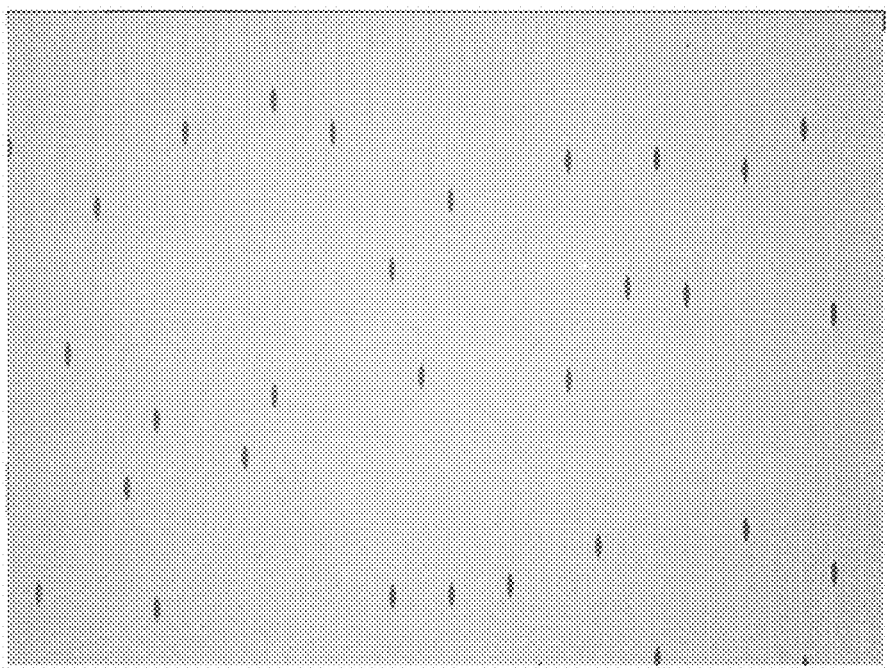
FIGS. 14-16 illustrate examples of feature density on the tooling surface for features with a 5-micron height, in accordance with an embodiment of the present description.
Figure 15:
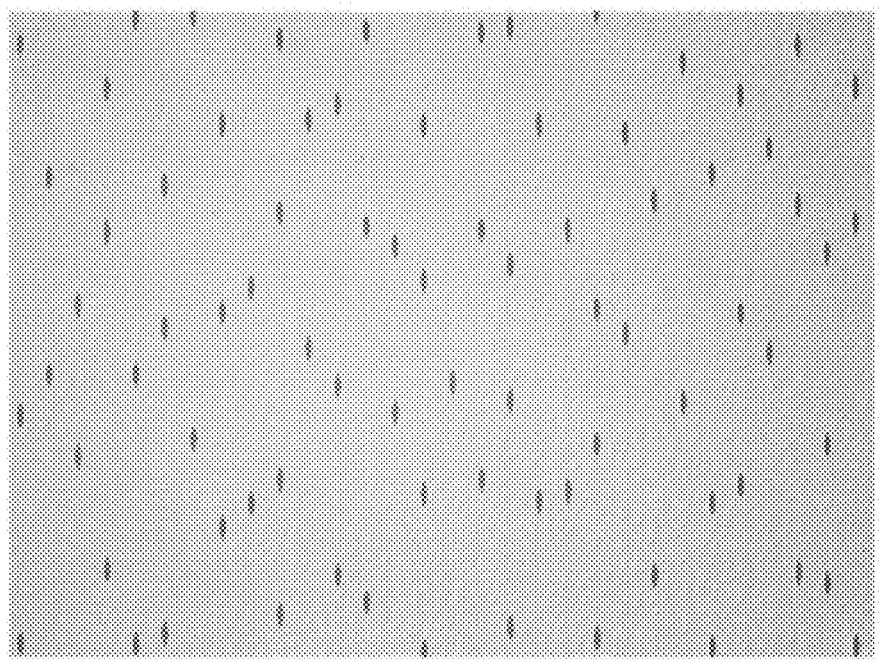
Figure 16:
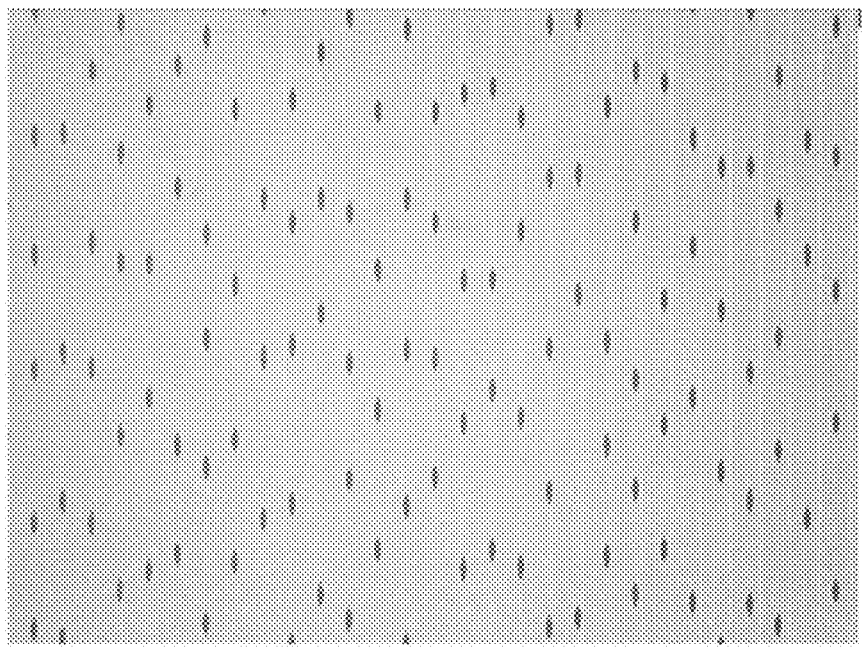

FIGS. 14-16 illustrate examples of feature density on the tooling surface for features with a 5-micron height. FIG. 14 shows an image of an example with 20 features per $mm^2$. FIG. 15 shows an image of an example with 50 features per $mm^2$. FIG. 16 shows an image of an example with 80 features per $mm^2$.

Figure 17:
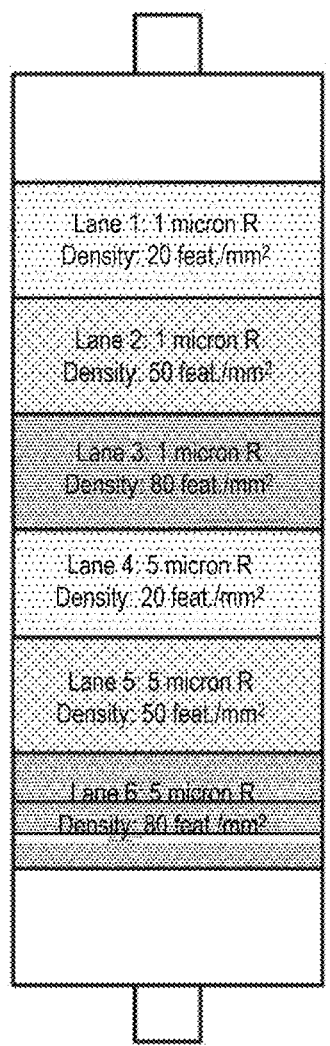
FIG. 17 illustrates the layout of tooling used to create the examples for this specification, in accordance with an embodiment of the present description.

The six AWO structures shown in Table 1 were fabricated on a roll material with details shown in the tooling layout in FIG. 17.

Microreplication process for the AWO structures. The roll material with six AWO microstructures on the previous section were microreplicated with a continuous roll-to-roll process with the following input materials:
   1. Diffuse film with 80% haze diffuse structures on an optical PET substrate as an input film.
   2. 100% solid UV curable resin with cured refraction index of about 1.5067, and formulated as shown in Table 5.

The AWO structures were coated on the side of the diffuse film opposite the diffuse structures.

TABLE 5

Formulation of UV Curable Resin.

| Formulation | Wt % |
| --- | --- |
| HDDA | 20% |
| TMPTA | 20% |
| TPO | 0.5% |
| Photomer 6210 | 59.5% |

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially equal" is not otherwise clear to one of ordinary skill in the art in the context in which it is used and described in the present description, "substantially equal" will mean about equal where about is as described above. If the use of "substantially parallel" is not otherwise clear to one of ordinary skill in the art in the context in which it is used and described in the present description, "substantially parallel" will mean within 30 degrees of parallel. Directions or surfaces described as substantially parallel to one another may, in some embodiments, be within 20 degrees, or within 10 degrees of parallel, or may be parallel or nominally parallel. If the use of "substantially aligned" is not otherwise clear to one of ordinary skill in the art in the context in which it is used and described in the present description, "substantially aligned" will mean aligned to within 20% of a width of the objects being aligned. Objects described as substantially aligned may, in some embodiments, be aligned to within 10% or to within 5% of a width of the objects being aligned.

All references, Patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optically diffusive film comprising:
   a unitary optical layer comprising a first major surface and an opposing structured second major surface comprising a plurality of spaced apart elongated structures elongated along a same first direction and arranged at a substantially uniform density of between about 5 to 100 structures per square mm across the second major surface, each elongated structure comprising a peak such that in a plane of a cross-section of the elongated structure that comprises the peak and is parallel to:
   the first direction, the elongated structure has a length L1, a height variation of less than about 5% across a substantially flat top region having a length d, $d/L1 \geq 0.15$, and a full width at half maximum W1; and
   a second direction orthogonal to the first direction, the elongated structure has a full width at half maximum W2, $W2/W1 \leq 0.6$, wherein:

a power spectral density of the structured second major surface has a first peak along the first direction having a first peak intensity I1 and a second peak along the second direction having a second peak intensity I2, $1 \leq I1/I2 \leq 10{,}000$.

2. The optically diffusive film of claim 1, wherein $10 \leq I1/I2 \leq 10{,}000$.

3. The optically diffusive film of claim 1, wherein $100 \leq I1/I2 \leq 10{,}000$.

\* \* \* \* \*